United States Patent
Bossen et al.

(10) Patent No.: US 6,332,181 B1
(45) Date of Patent: Dec. 18, 2001

(54) RECOVERY MECHANISM FOR L1 DATA CACHE PARITY ERRORS

(75) Inventors: Douglas Craig Bossen, Austin; Kevin Arthur Chiarot, Pflugerville; Namratha Rajasekharaiah Jaisimha; Avijit Saha, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/072,324

(22) Filed: May 4, 1998

(51) Int. Cl.[7] ............................. G06F 12/08; G06F 11/00
(52) U.S. Cl. ..................... 711/155; 711/117; 711/118; 714/48
(58) Field of Search ................................. 711/155, 118, 711/3, 154; 710/260; 714/48, 42

(56) References Cited

U.S. PATENT DOCUMENTS

| | | | |
|---|---|---|---|
| 5,283,876 | 2/1994 | Tague | 711/207 |
| 5,375,211 | * 12/1994 | Maruyama et al. | 710/110 |
| 5,550,988 | 8/1996 | Sarangdhar et al. | 710/113 |
| 5,604,753 | 2/1997 | Bauer et al. | 714/763 |
| 5,630,055 | 5/1997 | Bannon et al. | 714/52 |
| 5,649,090 | * 7/1997 | Edwards et al. | 714/10 |
| 5,875,201 | * 2/1999 | Bauman et al. | 714/800 |
| 6,014,756 | * 1/2000 | Dottling et al. | 714/15 |

\* cited by examiner

Primary Examiner—Tuan V. Thai
(74) Attorney, Agent, or Firm—Volel Emile; Felsman, Bradley, Vaden, Gunter & Dillon, LLP

(57) ABSTRACT

A method of handling a cache error (such as a parity error), which allows a software recovery, by reporting the error using an unrelated system resource, such as an interrupt service, and particularly a data storage interrupt. The parity error can be reported by generating a data storage interrupt and using the data storage interrupt status register (DSISR) to indicate that the data storage interrupt is a result of the parity error. The context of the processor can be fully synchronized while handling the parity error.

10 Claims, 2 Drawing Sheets

RECOVERY MECHANISM FOR L1 DATA CACHE PARITY ERRORS

BACKGROUND OF THE INVENTION

1. Field of the Invention

The present invention generally relates to computer systems, and more specifically to a method of operating a computer system in such a manner as to allow a software recovery from detected errors, such as a parity error arising during execution of program instructions, without requiring a machine check, that is, without requiring a "reboot" of the system, and particularly to such a method adapted for parity errors occurring in a first level data cache.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values fed to or generated by the programs. A processing unit communicates with the peripheral devices by various means, including a generalized interconnect or bus, or direct memory-access channels. A computer system may have many additional components, such as serial and parallel ports for connection to, e.g., modems, printers, and network adapters. Other components might further be used in conjunction with the foregoing; for example, a display adapter might be used to control a video display monitor, a memory controller can be used to access the system memory, etc.

A conventional processing unit includes a processor core having various execution units and registers, as well as branch and dispatch units which forward instructions to the appropriate execution units. Caches are commonly provided for both instructions and data, to temporarily store values that might be repeatedly accessed by a processor, in order to speed up processing by avoiding the longer step of loading the values from system memory (RAM). These caches are referred to as "on-board" when they are integrally packaged with the processor core on a single integrated chip. Each cache is associated with a cache controller or bus interface unit that manages the transfer of values between the processor core and the cache memory.

A processing unit can include additional caches, such as a level 2 (L2) cache which supports the on-board (level 1) caches. In other words, the L2 cache acts as an intermediary between system memory and the on-board caches, and can store a much larger amount of information (both instructions and data) than the on-board caches can, but at a longer access penalty. Multi-level cache hierarchies can be provided where there are many levels of interconnected caches.

A typical system architecture is shown in FIG. 1, and is exemplary of the PowerPC™ processor marketed by International Business Machines Corporation (IBM—assignee of the present invention). Computer system 10 includes a processing unit 12a, various I/O devices 14, RAM 16, and firmware 18 whose primary purpose is to seek out and load an operating system from one of the peripherals whenever the computer is first turned on. Processing unit 12a communicates with the peripheral devices using a system bus 20 (a local peripheral bus (e.g., PCI) can be used in conjunction with the system bus). Processing unit 12a includes a processor core 22, and an instruction cache 24 and a data cache 26, which are implemented using high speed memory devices, and are integrally packaged with the processor core on a single integrated chip 28.

Cache 30 (L2) supports caches 24 and 26 via a processor bus 32. For example, cache 30 may be a chip having a storage capacity of 256 or 512 kilobytes, while the processor may be a PowerPC™ 604-series processor having on-board caches with 64 kilobytes of total storage. Cache 30 is connected to bus 20, and all loading of information from memory 16 into processor core 22 must come through cache 30. More than one processor may be provided, as indicated by processing unit 12b.

Values are stored in a computer using bits (binary digits), which can have a value of zero or one. A bit in a given cache block may contain an incorrect value, either due to a soft error (a random, transient condition caused by, e.g., stray radiation or electrostatic discharge) or to a hard error (a permanent condition, e.g., defective cell). One common cause of errors is a soft error resulting from alpha radiation emitted by the lead in the solder (C4) bumps used to form wire bonds with circuit leads. Most errors are single-bit errors, that is, only one bit in the field is incorrect.

If a cache block, such as in data cache 26, contains an error (that cannot be corrected with, e.g., error-correcting code) then data cache 26 notifies processor core 22 of the parity error. While parity errors can be detected, there is currently no mechanism to enable the computer's operating system to identify offending instructions and provide context synchronization. As a result, for many systems, there is no software recovery mechanism defined and all parity errors result in a machine check, that is, a reboot of the system. "Rebooting" refers to the restarting of a computer system by reloading its most basic program instructions, viz., the operating system, and is very time-consuming. This limitation presents a serious quality issue for such systems, not only since it presents an inconvenience, but also because files or data can be lost. It would, therefore, be desirable to devise a method of allowing software recovery from, e.g., L1 data cache parity errors. It would be further advantageous if the method were to allow full context synchronization to enable multiple software recovery schemes.

SUMMARY OF THE INVENTION

It is therefore one object of the present invention to provide an improved computer system having a processor which includes a cache memory.

It is another object of the present invention to provide such an improved computer system which allows software recovery of cache errors such as parity errors.

It is yet another object of the present invention to provide such a recovery mechanism for cache parity errors that enables context synchronization to reduce adverse effects of the failure.

The foregoing objects are achieved in a method of handling a cache parity error in a computer system, generally comprising the steps of constructing an interrupt service for suspending current operations of a processor of the computer system upon the occurrence of a defined condition other than a cache parity error, detecting a parity error in a cache associated with the processor, and reporting the parity error to the processor using the interrupt service. The described implementation is adapted for handling on-board (L1) cache parity errors arising from load instructions, although the invention can also be used to handle cache parity errors arising from store instructions. In a preferred embodiment, the parity error is reported by generating a data storage interrupt, and using a data storage interrupt status register (DSISR) to indicate that the data storage interrupt is a result of the parity error.

The invention advantageously allows synchronizing of the processor context. A machine status register of the processor (one of the save/restore registers), is used to hold a pointer for a next-to-complete instruction such that all instructions preceding the next-to-complete instruction have already completed execution, and no instruction subsequent to the next-to-complete instruction has begun execution. A flush of the corresponding cache block is performed in response to the data storage interrupt.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
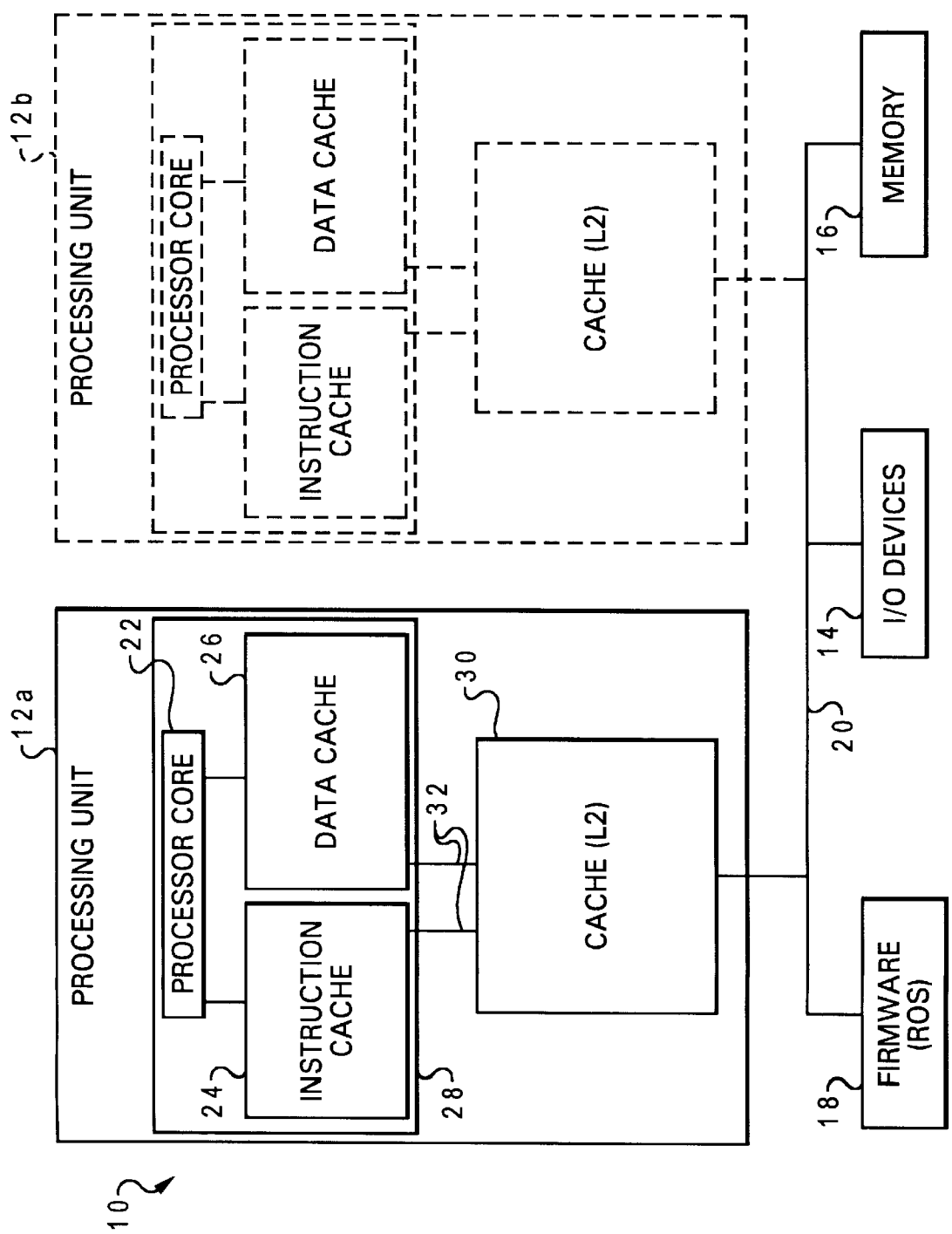
FIG. 1 is a block diagram of a prior art multi-processor computer system.

The present invention is directed to a method of allowing software recovery from detected cache errors. In the implementation described below, the invention provides a mechanism for making L1 data parity errors, which arise from load instructions, visible to a computer's operating system, such as the AIX operating system (AIX is a trademark of IBM). Software recovery is enabled by simulating an interrupt, particularly, a data storage interrupt (DSI), in response to an L1 parity error for the instruction.

Interrupts are used in computers to allow a wide variety of devices to obtain the attention of the computer processor, in order to request services, or report problems. When a processor receives an interrupt, it usually suspends its current operations, saves the status of its work (the processor "context"), and transfers control to a special routine known as an interrupt handler. The interrupt handler contains instructions for dealing with the particular condition that caused the interrupt. A table stored in memory contains pointers (vectors) which provide the addresses of various instructions making up the interrupt handlers. In addition to external interrupts generated by peripheral devices, the processor itself can issue internal interrupts in response to program errors (such as an attempt during a division operation to divide by zero) or to request operating system services. Different priorities may be assigned to different interrupts to control the handling of simultaneous interrupt requests. Interrupt request lines, built into the computer's internal hardware, are used to send interrupts to the CPU.

The use of the DSI is not mandatory, and those skilled in the art will appreciate that other resources (system bits which are accessible by software) may be used according to the particular computer architecture. It is convenient to use a data storage interrupt to report a parity error since the data storage interrupt status register (DSISR) has extra bits available which can be used to indicate that the interrupt is actually the result of a parity error (bits 7 and 8 of the DSISR are spare and normally are set to zero).

The transformation of a parity error to an interrupt is preferably accomplished at a stage such that all registers are set appropriately without any additional logic, to achieve full context synchronization. Synchronization refers to the state of all instructions and data values being valid for a particular process running in the processor (which is critical in superscalar processor wherein many instructions can be simultaneously dispatched). Such synchronization is important since it enables a rich set of software recovery schemes, but synchronization is not essential to the invention. Other mechanisms may not provide context synchronization.

In this regard, use of a DSI is particularly convenient since the invention may be embodied in systems (similar to the PowerPC™ 630fp processor) which perform a global flush for complete context synchronization after a DSI condition is detected. If the normal machine check path is disabled and a parity error is instead transformed into a DSI, the same context synchronization can be accomplished for the parity error without any penalty, i.e., without any other added hardware. In general, a parity error event will be context synchronizing if it satisfies the following requirements: (1) the operation causes instruction dispatching to be halted; (2) the load operation is not completed until all instructions already in execution are to a point at which they have reported all exceptions they will cause; (3) the instructions that precede the load operation will complete execution in the category (privilege, relocation, storage protection, etc.) in which they were initiated; and (4) all effects of speculative fetches and execution are discarded, and instructions that follow the culprit load operation can be fetched and executed in the context established by the operation.

According to a preferred implementation, when an interrupt occurs, a machine status register referred to as the save/restore register zero (SRR0) is set to point to an instruction such that all preceding instructions have completed execution, and no subsequent instruction has begun execution. The instruction addressed by SRR0 may or may not have completed execution depending on interrupt type. Whether SRR0 points to the instruction that caused the interrupt or the following instruction can be determined from the status bits and interrupt type, which must be set properly.

Figure 2:
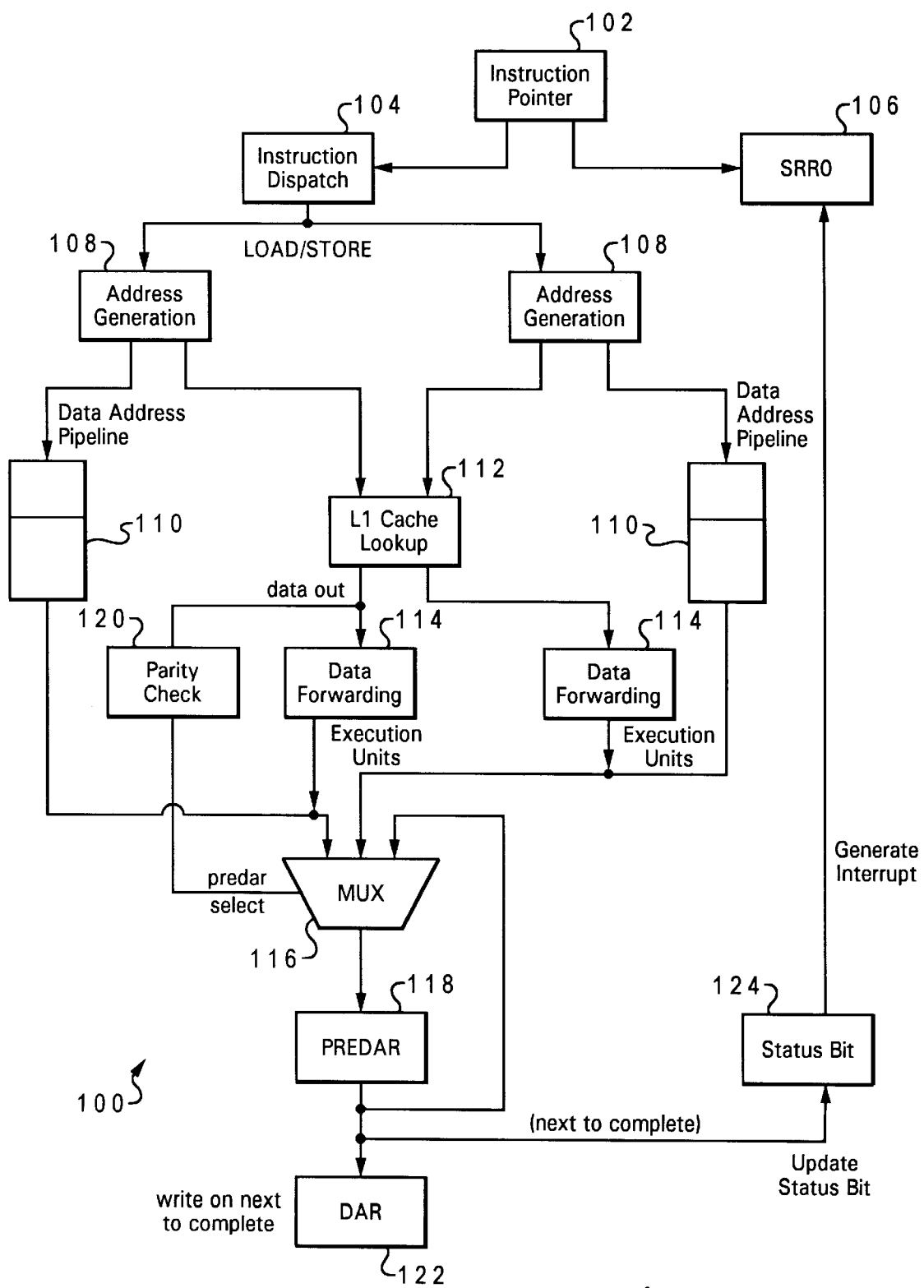
FIG. 2 is a block diagram of one embodiment of processor logic which can be used to transform an L1 data cache parity error into a data storage interrupt, in accordance with the present invention.

With reference now to the figures, and in particular with reference to FIG. 2, there is depicted a block diagram of one embodiment of processor logic 100 which can be used to transform an L1 data cache parity error into a DSI. Processor logic 100 includes a branch unit 102, which determines what sequence of instructions is appropriate, in a manner known in the art. Branch unit 102 forwards the ordered instructions to a dispatch unit 104, which issues the individual instructions to the appropriate logic unit (e.g., a load/store unit, fixed-point execution unit, or floating-point execution unit). Branch unit 102 is also connected to a save/restore register (SRR0) 106 such that, when a load operation is initiated, a pointer to the instruction containing the load operation is stored in SRR0 106.

Load operations are forwarded by dispatch unit 104 to one or more load/store units 108 which generate the address of the requested value. This address is transmitted to data address pipelines 110 and to an L1 cache lookup (directory) 112. Data is forwarded from lookup 112, using bus interface 114, to the inputs of a multiplexer 116. Multiplexer 116 has a third input which is connected to a "previous" data address register (PREDAR) 118. Multiplexer 116 is controlled by a parity check circuit 120 which selects the PREDAR line if L1 cache lookup 112 outputs data containing a parity error. If the instruction resulting in the error is the next to complete, then the contents of PREDAR 118 are moved to a data address register (DAR) 122. The appropriate status bit 124 is updated to indicate whether instruction completed, and a synchronous machine check interrupt (e.g., DSI) is generated. The contents of DAR 122 are read, and a flush (e.g., a "dcbf" PowerPC™ instruction) is performed on the cache block corresponding to the address contained in DAR 122. Presuming that the data was consistent with system memory (e.g., not in the "modified" cache coherency state), then the corresponding cache block is simply marked as "invalid" and, upon returning from interrupt handling, program execution may continue with the instruction to which SRR0 points. If the data had been modified, then a machine check must be generated.

In an alternative implementation that does not use the DSISR bits, a parity error is converted from an asynchronous machine check to a "synchronous" (that is, tied to the instruction which caused the error) and recoverable machine check. This implementation sets a bit in another save/restore register SRR1 to indicate whether or not the cache parity error is recoverable. The address of the bad line (the interrupting instruction) is found in the DAR.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the above-described implementation only handles L1 data cache parity errors during load operations (which is generally more meaningful since most L1 parity errors occur during loads), but parity errors resulting from store operations can also be handled in a similar manner, although with added complexity. It is therefore contemplated that such modifications can be made without departing from the spirit or scope of the present invention as defined in the appended claims.

What is claimed is:

1. A method of handling a cache error in a computer system, comprising the steps of:

constructing an interrupt service for suspending current operations of a processor of the computer system upon the occurrence of a defined condition other than a cache error, said constructing step including the step of defining a data storage interrupt service having an associated data storage interrupt handler;

detecting an error in a cache associated with the processor;

reporting the error to the processor using the interrupt service, said reporting step including the steps of generating a data storage interrupt, and using a data storage interrupt status register to indicate that the data storage interrupt is a result of the error; and in response to said data storage interrupt, synchronizing a context of said processor, wherein said synchronization is comprises:

halting instruction dispatching;

completing instructions already in execution in the processor in respective categories in which the instructions were initiated, to a point at which the instructions have reported any exceptions they will cause; and have already completed execution, and no instruction subsequent to the next-to-complete instruction has begun execution.

2. The method of claim 1 wherein said detecting step is performed in response to the step of the processor issuing a load instruction to the cache, and the error is a parity error.

3. The method of claim 1 wherein said synchronizing step includes the further step of loading a pointer in a machine status register of the processor, wherein the pointer points to a next-to-complete instruction such that all instructions preceding the next-to-complete instruction have already completed execution, and no instruction subsequent to the next-to-complete instruction has begun execution.

4. The method of claim 3 further comprising the step of resuming operation of the processor, after said reporting step, with the next-to-complete instruction.

5. The method of claim 1 wherein:

the error is a cache parity error;

said reporting step includes the further step of generating a data storage interrupt; and said synchronizing step includes the further step of flushing a cache block, in the cache, associated with the parity error.

6. The method of claim 5 wherein a coherency state of the cache block is marked as invalid in response to said flushing step.

7. A computer system comprising;

memory means for storing a plurality of values;

means for processing program instructions, said processing means including cache means for storing one or more values associated with respective addresses of said memory means;

means interconnecting said processing means with said memory means;

an operating system controlling said processing means;

means for handling an error in said cache means such that said processing means continues operation after the cache error without restarting the operating system, said handling means including means for defining a data storage interrupt service having an associated data storage interrupt handler, means for generating a data storage interrupt, and means for indicating to is said data storage interrupt service that the data storage interrupt is a result of the error; and synchronizing means for synchronizing a context of said processing means, wherein in response to a data storage interrupt resulting from a cache parity error, said synchronizing means loads a pointer in a machine status register of said processor, wherein the pointer points to a next-to-complete instruction such that all instructions preceding the next-to-complete instruction have already completed execution, and no instruction subsequent to the next-to-complete instruction has begun execution.

8. The computer system of claim 7 wherein the error is a cache parity error, and said handling means includes means for detecting the cache parity error in response to execution of an associated load instruction.

9. The computer system of claim 7 wherein the error is a cache parity error, and said synchronizing means flushes a cache block, in said cache means, associated with the parity error.

10. The computer system of claim 9 wherein said synchronizing means further marks said cache block as invalid.

* * * * *